United States Patent
Ho et al.

(10) Patent No.: US 7,940,484 B2
(45) Date of Patent: May 10, 2011

(54) COLOR WHEEL AND OPTICAL DEVICE EMPLOYING SAME

(75) Inventors: Yu-Lun Ho, Taipei Hsien (TW);
Po-Wen Chan, Taipei Hsien (TW);
Juin-Hong Lin, Taipei Hsien (TW);
I-Pen Chien, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 316 days.

(21) Appl. No.: 12/261,020

(22) Filed: Oct. 29, 2008

(65) Prior Publication Data
US 2009/0323152 A1 Dec. 31, 2009

(30) Foreign Application Priority Data
Jun. 30, 2008 (CN) .......................... 2008 1 0302488

(51) Int. Cl.
*G02B 5/22* (2006.01)
*G03B 21/14* (2006.01)
(52) U.S. Cl. ........................... 359/892; 359/885; 353/84
(58) Field of Classification Search .................. 359/892; 353/84, 94
See application file for complete search history.

(56) References Cited

U.S. PATENT DOCUMENTS

| | | | | |
|---|---|---|---|---|
| 4,076,393 | A * | 2/1978 | Bates | 359/892 |
| 6,793,345 | B2 * | 9/2004 | Dho | 353/94 |
| 7,233,450 | B2 | 6/2007 | Kao et al. | |
| 2007/0053089 | A1 * | 3/2007 | Yu et al. | 359/892 |
| 2008/0151402 | A1 * | 6/2008 | Hsu | 359/892 |
| 2009/0008625 | A1 * | 1/2009 | Tsai et al. | 257/13 |

* cited by examiner

*Primary Examiner* — Audrey Y Chang
(74) *Attorney, Agent, or Firm* — Zhigang Ma

(57) ABSTRACT

A projector includes a light source assembly, a digital micromirror device, and a projection lens. The light source assembly includes a lamp and a color wheel positioned for receiving light generated by the lamp. The color wheel includes a motor having a contacting portion, a filter, a light-blocker, and a light-isolating sheet. The filter is mounted on the contacting portion of the motor and includes a first area and a second area. Light beams used for forming an image only pass through the first area. The light-blocker is disposed on the filter opposite to the motor. The light-isolating sheet is disposed on the first area and positioned between the filter and the motor and configured for isolating the light beams arrived on the second area.

17 Claims, 3 Drawing Sheets

COLOR WHEEL AND OPTICAL DEVICE EMPLOYING SAME

BACKGROUND

1. Technical Field

The present disclosure relates to a color wheel and an optical device having the same.

2. Description of the Related Art

In general, an optical engine is provided in a display apparatus such as a projection television, a projector, or the like, for projecting an image on a screen. Such an optical engine is classified into various types, e.g., cathode ray tube (CRT) type, liquid crystal display (LCD) type, digital light processing (DLP) type, and the like according to display devices for displaying processed video data. The DLP type optical engine conventionally includes a color wheel. The color wheel includes a number of color filters for selectively filtering red (R), green (G) or blue (B) lights out of white light emitted from a light source. The color wheel is rotatable for allowing the white light emitted from the light source to selectively pass through one of the color filters. Currently, color wheels are constructed with the color filters glued to a filter supporter. As a consequence, color filters fall off because of centrifugal force generated by high-speed rotation of the color wheel overcoming the bond of the glue.

What is needed, therefore, is a color wheel that can overcome the above-described shortcoming.

BRIEF DESCRIPTION OF THE DRAWINGS

The present color wheel and optical device are described in detail hereinafter, by way of example and description of preferred and exemplary embodiments thereof and with references to the accompanying drawings, in which:

FIG. 3 is similar to FIG. 2 but viewing the color wheel head-on.

DETAILED DESCRIPTION

A detailed explanation of an optical device having a color wheel according to an exemplary embodiment will now be made with references to the drawings attached hereto.

Figure 1:
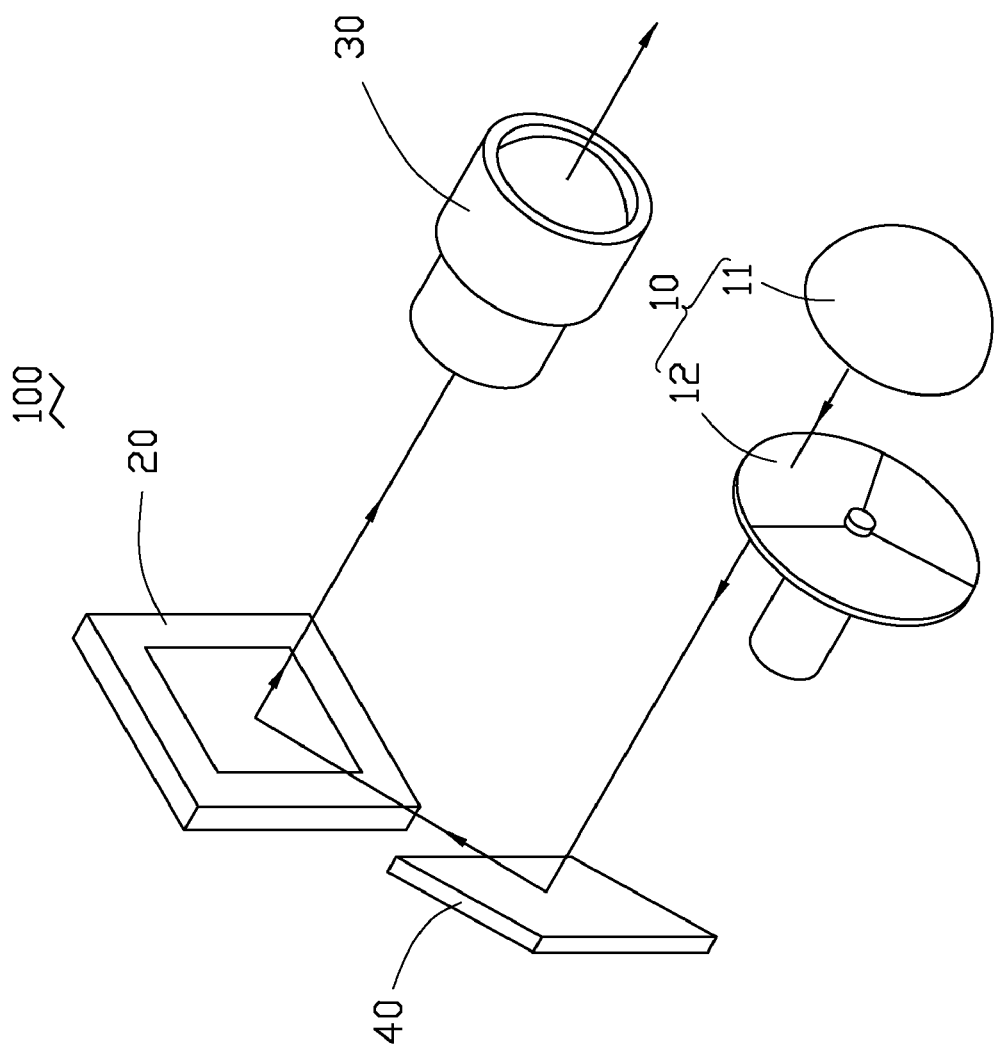
FIG. 1 is a schematic view of an optical device having a color wheel according to an exemplary embodiment.

Referring to FIG. 1, a projector 100 as an optical device according to the exemplary embodiment is shown. The projector 100 includes a light source assembly 10, a digital micro-mirror device (DMD) 20, and a projection lens 30. The DMD 20 is positioned for receiving light beams generated by the light source assembly 10. The projection lens 30 is disposed in the reflecting-light path of the digital micro-mirror device 20. The projector 100 also includes a mirror 40 for changing the path of the light transmitted by the light source assembly 10, as desired.

The light source assembly 10 includes a lamp 11 and a color wheel 12 positioned for receiving light beams generated by the lamp 11. The lamp 11 is configured for providing light beams for the projector 100 and can be a halogen lamp, a metal halogen lamp, a LED, or the like. In the present embodiment, the lamp 11 is a halogen lamp that emits a white light.

Figure 2:
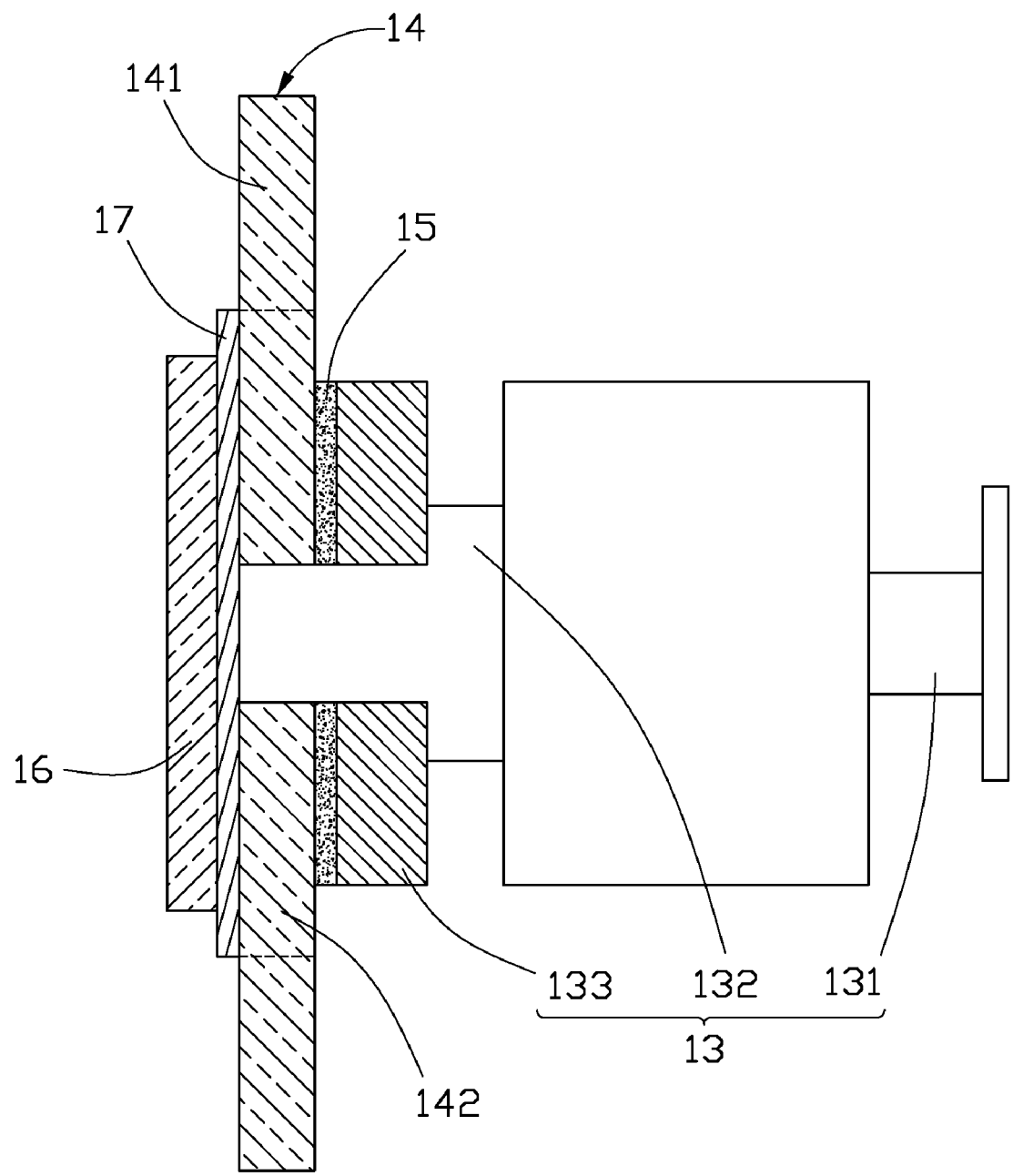
FIG. 2 is a side, partially sectional view of the color wheel of FIG. 1.
Figure 3:
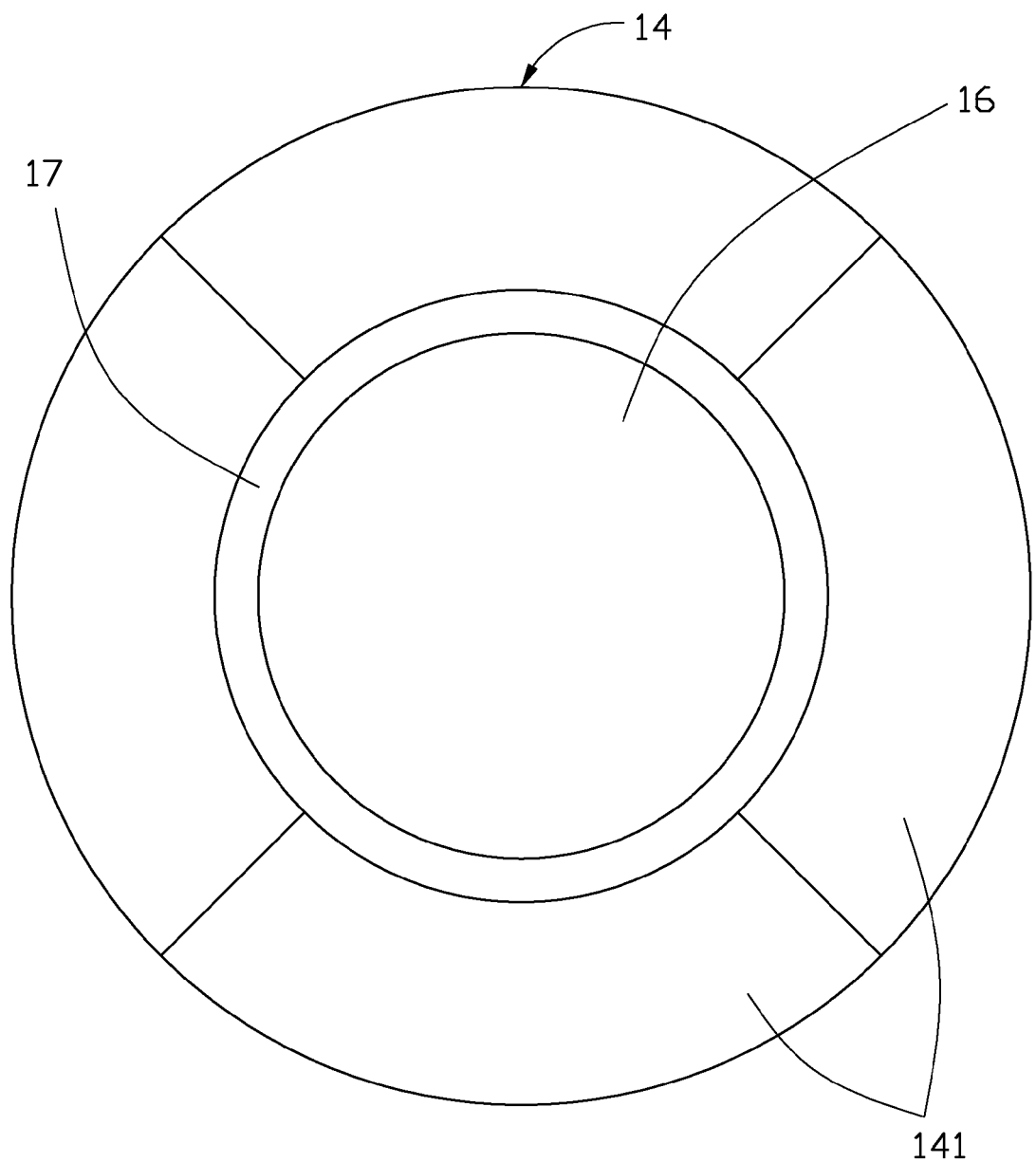

The color wheel 12 is configured for splitting the light beams output from the lamp 11 into red, green and blue light beams. Referring also to FIGS. 2 and 3, the color wheel 12 includes a motor 13, a filter 14, an adhesive material 15, a light-blocker 16, and a light-isolating sheet 17.

The motor 13 includes a rotor 131 having an electromagnetic assembly consisted of magnets, silicon steel sheets, wires, and the like, and a stator (not shown). When the motor 13 is on, the electromagnetic assembly drives the rotor 131 to rotate the filter 14. An end of the rotor 131 has a rotating plate 132 disposed thereon. A contacting portion 133 is defined on the rotating plate 132 for fixing the filter 14.

The filter 14 may be a circular transparent substrate and is separated into a number of fans. Different parameter filter films are respectively coated on the fans for passage of light beams of different wavelength. In present embodiment, the transparent substrate is made of glass. The filter 14 is fixed on the contacting portion 133 by the adhesive material 15. The adhesive material 15 may be an epoxy. The filter 14 includes a first area 141 and a second area 142. Light beams used for projecting an image pass through the first area 141 and do not pass through the second area 142.

The light blocker 16 is fixed on the filter 14 opposite to the motor 13 for preventing the light beams directly striking on the adhesive materials 15. The light blocker 16 is made of the same material as the filter 14. Therefore, the light blocker 16 has a same thermal expansion coefficient with the filter 14 so as to generate a same thermal stress on the light blocker 16 and the filter 14, which can prevent damage to the filter 14 and the light blocker 16 by expansion and contractions of the parts caused by temperature changes.

The light-isolating sheet 17 is positioned between the filter 14 and the light blocker 16 for preventing stray light striking on the second area 142 of the filter 14 to protect the adhesive materials 15. The light-isolating sheet 17 may be one of a UV-filter film, a metal layer, an ink layer or a dielectric layer, which is adhered on the second area 142 of the filter 14. It also may be an atomizing layer defined on the second area 142. In present embodiment, the light-isolating sheet 17 is a UV-filter film. The area of the light-isolating sheet 17 is the same as that of the second area 142 for fully covering the second area 142.

The DMD 20 is configured for superimposing spatial information on the light beams output by the color wheel 12.

The projection lens 30 is configured for receiving the light output from the DMD 20 and magnifying and projecting an image formed by the light output on a screen.

Thus, the adhesive material 15 in the projector 100 according to the exemplary embodiment of the present disclosure includes can be maintained in good condition due to the protection of the light-blocker 16, together with the light-isolating sheet 17. Accordingly the filter 14 is stably mounted even when the color wheel 12 rotates at high speed. As described above, the present embodiment provides a color wheel 12 and an optical device with the same in which a filter 14 is prevented from radially breaking away even though the color wheel 12 rotates at high speed.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A color wheel, comprising:
   a motor having a contacting portion;
   a filter mounted on the contacting portion of the motor, the filter comprising an first area and a second area, light beams used for forming an image only passing through the first area, the filter being mounted on the motor by adhesion material applied between the motor and the filter;
a light-blocker disposed on the filter opposite to the motor; and
a light-isolating sheet disposed on the second area and positioned between the filter and the light-blocker, the light-isolating sheet being configured for blocking the light beams to arrive on the second area to protect the adhesion material positioned between the motor and the filter.

2. The color wheel as claimed in claim 1, wherein the adhesion material is an epoxy.

3. The color wheel as claimed in claim 1, wherein the light-blocker is made of the same material as the filter.

4. The color wheel as claimed in claim 1, wherein the light-isolating sheet comprises a UV-filter film disposed on the second area of the filter.

5. The color wheel as claimed in claim 1, wherein the light-isolating sheet comprises a metal layer disposed on the second area of the filter.

6. The color wheel as claimed in claim 1, wherein the light-isolating sheet comprises an ink layer disposed on the second area of the filter.

7. The color wheel as claimed in claim 1, wherein the light-isolating sheet comprises a dielectric layer disposed on the second area of the filter.

8. The color wheel as claimed in claim 1, wherein the light-isolating sheet is an atomizing film defined on the second area of the filter therein.

9. A light source assembly, comprising:
a lamp; and
a color wheel positioned for receiving light generated by the lamp, the color wheel comprising:
  a motor having a contacting portion;
  a filter mounted on the contacting portion of the motor, the filter comprising a first area and a second area, light beams used for forming an image only passing through the first area, the filter being mounted on the motor by adhesion material applied between the motor and the filter;
  a light-blocker disposed on the filter opposite to the motor; and
  a light-isolating sheet disposed on the second area and positioned between the filter and the light-blocker, the light-isolating sheet being configured for blocking the light beams to arrive on the second area to protect the adhesion material positioned between the motor and the filter.

10. The light source assembly as claimed in claim 9, wherein the light-isolating sheet comprises a UV-filter film, a metal layer, an ink layer, and a dielectric layer.

11. The light source assembly as claimed in claim 9, wherein the light-isolating sheet comprises a metal layer disposed on the second area of the filter.

12. The light source assembly as claimed in claim 9, wherein the light-isolating sheet comprises an ink layer disposed on the second area of the filter.

13. The light source assembly as claimed in claim 9, wherein the light-isolating sheet comprises a dielectric layer disposed on the second area of the filter.

14. The light source assembly as claimed in claim 9, wherein the high-isolating sheet comprises an atomizing film defined on the second area of the filter thereon.

15. A projector, comprising:
a light source assembly comprising:
  a lamp; and
  a color wheel positioned for receiving light generated by the lamp, the color wheel comprising:
    a motor having a contacting portion;
    a filter mounted on the contacting portion of the motor, the filter comprising a first area and a second area, light beams used for forming an image only passing through the first area, the filter being mounted on the motor by adhesion material applied between the motor and the filter;
    a light-blocker disposed on the filter opposite to the motor; and
    a light-isolating sheet disposed on the second area and positioned between the filter and the light-blocker, the light-isolating sheet being configured for blocking the light beams to arrive on the second area to protect the adhesion material positioned between the motor and the filter;
a digital micro-mirror device positioned for receiving the light generated the light source assembly; and
a projection lens positioned for receiving the light reflected by the digital micro-mirror device and configured for projected the image.

16. The projector as claimed in claim 15, wherein the light-isolating sheet is a light-isolating layer selected from the group consisted of a UV-filter film, a metal layer, an ink layer, and a dielectric layer.

17. The projector as claimed in claim 15, wherein the light-isolating sheet comprises an atomizing film defined on the second area of the filter.

* * * * *